(12) United States Patent  
Nohynek

(10) Patent No.: US 7,252,048 B2
(45) Date of Patent: Aug. 7, 2007

(54) COATING DEVICE WITH INTEGRATED CLEANING DEVICE

(75) Inventor: Oliver Nohynek, St. Gallen (CH)

(73) Assignee: Driam Anlagenbau GmbH, Eriskirch (DE)

( * ) Notice: Subject to any disclaimer, the term of this patent is extended or adjusted under 35 U.S.C. 154(b) by 72 days.

(21) Appl. No.: 10/536,465

(22) PCT Filed: Nov. 25, 2002

(86) PCT No.: PCT/DE02/04324

§ 371 (c)(1),
(2), (4) Date: May 25, 2005

(87) PCT Pub. No.: WO2004/047546

PCT Pub. Date: Jun. 10, 2004

(65) Prior Publication Data

US 2006/0162645 A1  Jul. 27, 2006

(51) Int. Cl.
*B05C 5/00* (2006.01)
*B01F 15/02* (2006.01)

(52) U.S. Cl. ............................. 118/19; 118/24; 118/303

(58) Field of Classification Search ................ 118/13, 118/19, 24, 418, 303; 366/187, 188, 220–234
See application file for complete search history.

(56) References Cited

U.S. PATENT DOCUMENTS 3,484,360 A  12/1969  Sandrock
3,827,182 A  8/1974  Van Helleputte
3,934,545 A  1/1976  Schady
3,944,189 A  3/1976  Singleton
5,494,709 A *  2/1996  Long et al. .................... 427/4
6,513,659 B1 *  2/2003  Ogura et al. ............. 206/524.8
6,582,516 B1 *  6/2003  Carlson ....................... 118/303

FOREIGN PATENT DOCUMENTS

DE  100 24 407  12/2001
EP  0 327 789  8/1989
EP  0 545 065  6/1993
FR  2 388 592  11/1978

\* cited by examiner

*Primary Examiner*—Chris Fiorilla
*Assistant Examiner*—Yewebdar Tadesse
(74) *Attorney, Agent, or Firm*—Collard & Roe, P.C.

(57) ABSTRACT

For a coating device for coating, for example, lenticular or granular items, comprising a drum rotatably mounted about a horizontal axis for accommodation of the items during a coating process, a loading device for filling the items into the drum, a closeable opening in the drum for admission of the uncoated items into the same and for allowing discharge of the coated items from the same, and a spraying device disposed within the drum for coating said items, concurrent execution of the operational phases of unloading and cleaning said device is enabled by providing an unloading device beneath the drum for removing the coated items, and between the unloading device and the drum there is provided a reciprocatory screening element which can be moved back and forth between a first position screening off said unloading device and a second position opening said unloading device.

17 Claims, 5 Drawing Sheets

COATING DEVICE WITH INTEGRATED CLEANING DEVICE

CROSS REFERENCE TO RELATED APPLICATIONS

Applicant claims priority under 35 U.S.C. §365 of PCT/DE2002/004324 filed on Nov. 25, 2002. The international application under PCT article 21(2) was not published in English.

The invention relates to a coating device for coating, for example, lenticular or granular items, comprising a drum rotatably mounted about a horizontal axis for acommodation of the items during a coating process, a loading device for filling the items into the drum, a closeable opening in the drum for admitting the uncoated items into the same and for allowing discharge of the coated items from the same, and a spraying device disposed within the drum for coating said items.

Coating devices of the type mentioned above have been known in the prior art for a number of years and are used, on the one hand, to surround solid units or cores of compressed pharmaceutical products with one or more shells, which facilitate, for example, swallowing thereof on the part of a person consuming the products. In the case of dragees, this shell consists substantially of sugar. In the case of other tablets, this shell can also be formed from a film based on synthetic substances. On the other hand, such known devices are used in the confectionery industry for surrounding cores of various consistencies with chocolate and/or sugar or other sweeteners.

The operation of conventional coating devices is normally divided into four operational phases. These comprise
1. loading the drum
2. coating the items
3. unloading the drum and removing the items
4. cleaning the drum The time taken to coat the items depends on the consistency and thickness of the coating to be applied and is in this regard predefined for any particular coating operation. The time taken to clean the drum is, depending on the coating material, generally a number of minutes and the time required to unload the drum and subsequently remove the finished coated items is also relatively short compared with the time it takes to coat the items. Nevertheless, operation of conventional devices has not yet been optimized, as the last two operational phases, in particular, can only be carried out sequentially.

Thus the operation of prior coating devices suffers from the drawback of not being optimally time-effective so that its cost-effectiveness has consequently not yet been fully optimized.

It is therefore an object of the present invention to provide a coating device by means of which the operational phases of unloading and cleaning can be carried out concurrently.

For a coating device of the type defined above, this object is achieved by providing an unloading device beneath the drum for removing the coated items, and between the unloading device and the drum there is provided a reciprocatory screening element which can be moved back and forth between a first position screening off the unloading device to a second position opening the unloading device.

The subclaims relate to preferred embodiments of the invention.

In the device of the invention, the fact that an unloading device is provided beneath the drum for discharge of the finished coated items, while between the unloading device and the drum there is provided a reciprocatory screening element which is movable back and forth between a first position screening off the unloading device and a second position opening the unloading device, means that on account of the drum being screened off from the unloading device cleaning of the drum can commence, without any danger of contaminating the coated items, simultaneously with the start of the process of removing the coated items or at least at a point in time before the process of removing the coated items from the unloading device has been completed. This is nowadays all the more important, since in some of the prior coating devices very large-volume drums having a capacity of a million or more items are used and, on unloading the drum, the items fall into the upper, wide opening of a funnel, in the region of the lower, narrow opening of which there is provided a conveyor belt for removing the items in a controlled manner, the period of time required for removing all of the items being generally again a number of minutes.

According to a first preferred embodiment of the device of the invention, provision is made for the screening element to be of curved design. The screening element is in this case preferably designed as part of a cylinder barrel, the radius of the cylinder barrel being dimensioned such that the screening element surrounds the drum with the smallest possible gap therebetween.

At each of its curved ends, the screening element preferably has front abutment faces in order to ensure that the coated items cannot be contaminated.

According to another preferred embodiment of the device of the invention, provision is made for the screening element to be fixed, for guiding purposes, to at least one roller-mounted guide rail where the at least one guide rail is preferably dimensioned to be of such a length that the screening element can be swung through approximately 90 degrees. Preferably, two guide rails are provided, of which one guide rail is connected to a front abutment face of the screening element. One or more of the roller bearings enabling reciprocatory displacement of the guide rails of the screening element are preferably attached to the unloading device, for reasons of stability.

The at least one guide rail of the screening element of the device of the invention is preferably of round cross-section, the rollers of a roller bearing having, in cross-section, an appropriate negative radius of curvature to render them concave, in order to ensure positive guidance.

According to a further preferred embodiment of the device of the invention, provision is made for the screening element to be connected, for the purpose of being driven for reciprocatory displacement, to a curved toothed rack cooperating with a motor-driven toothed wheel. The curved toothed rack is preferably connected to the outer surface of the cylinder barrel. For reasons of stability, the toothed wheel is likewise attached to the unloading device.

According to further preferred embodiments of the device of the invention, provision is made for the spraying device for cleaning fluid to be disposed in the vicinity of the spraying device used for coating the items. The unloading device preferably contains a funnel-shaped trough, and preferably a conveyor belt is provided beneath the funnel-shaped trough for the removal of the items in a controlled manner.

By means of the device of the invention, a plurality of iterative coating processes can be performed successively using different coating materials in each case.

The device of the invention is explained beneath with reference to a preferred embodiment, which is illustrated in the Figures in the drawings, in which FIG. 1 shows a first preferred embodiment of the device of the invention in side view;

Figure 1:
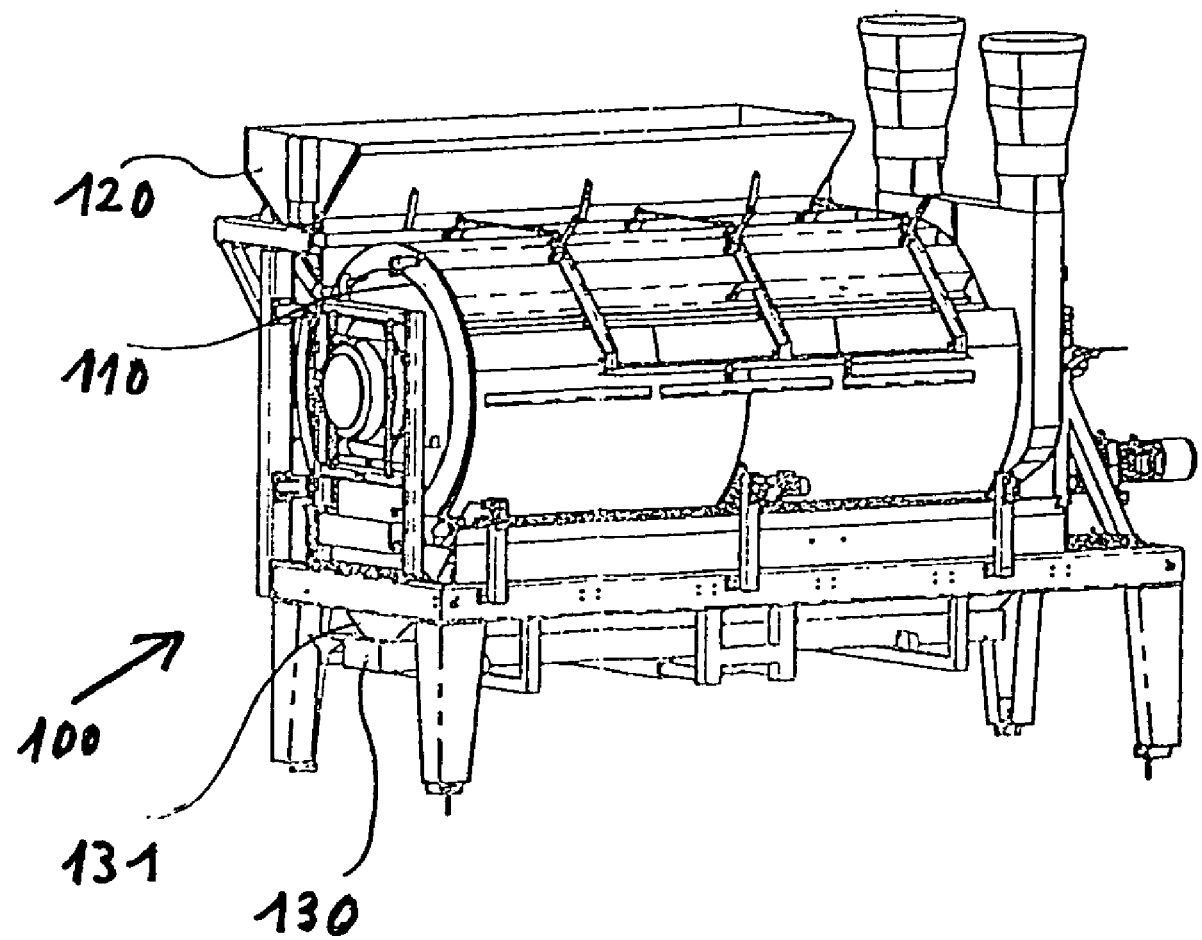
Figure 2:
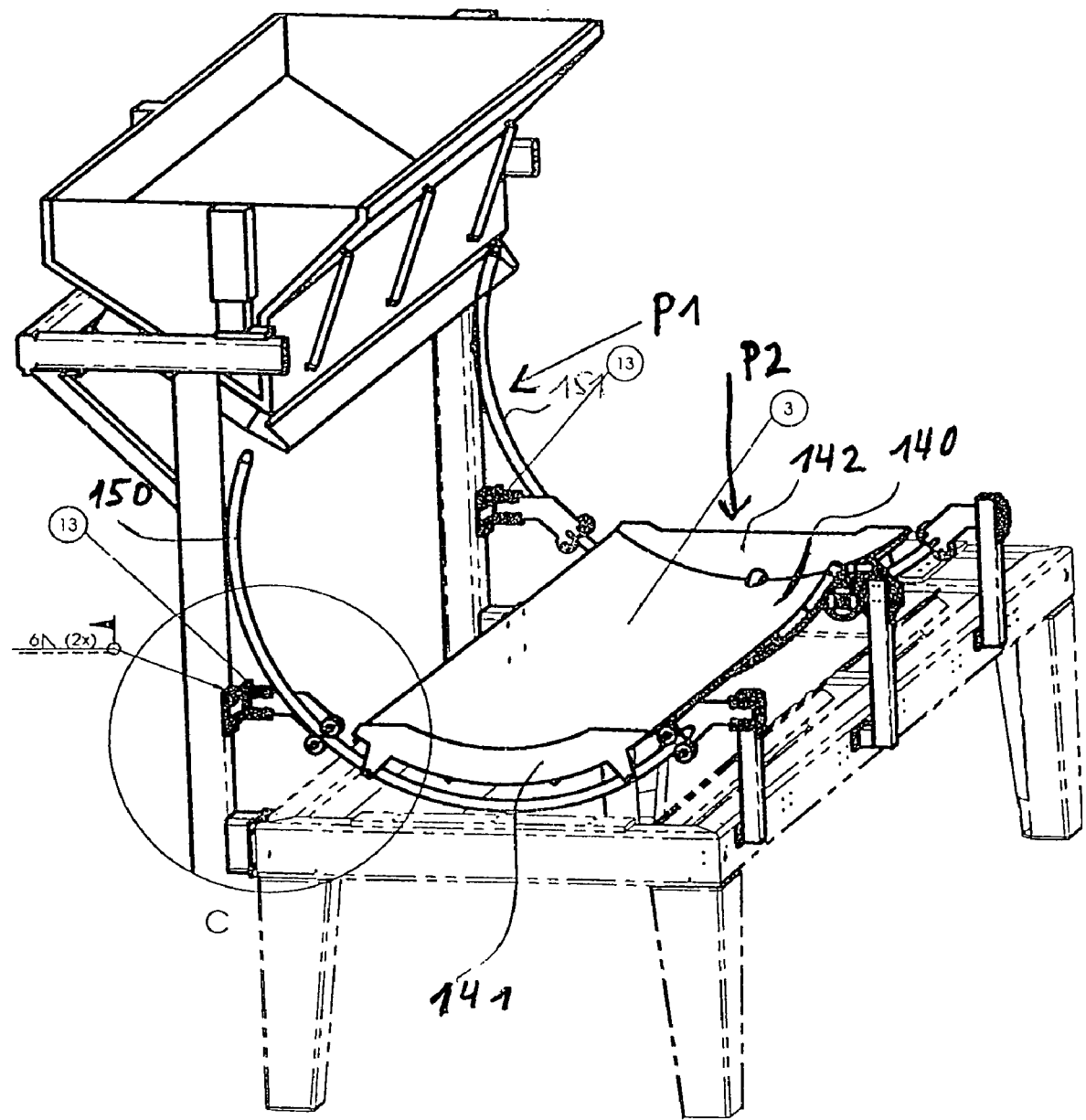
FIG. 2 shows the preferred embodiment of the device of the invention illustrated in FIG. 1 but without the drum, as viewed diagonally from above.
Figure 3:
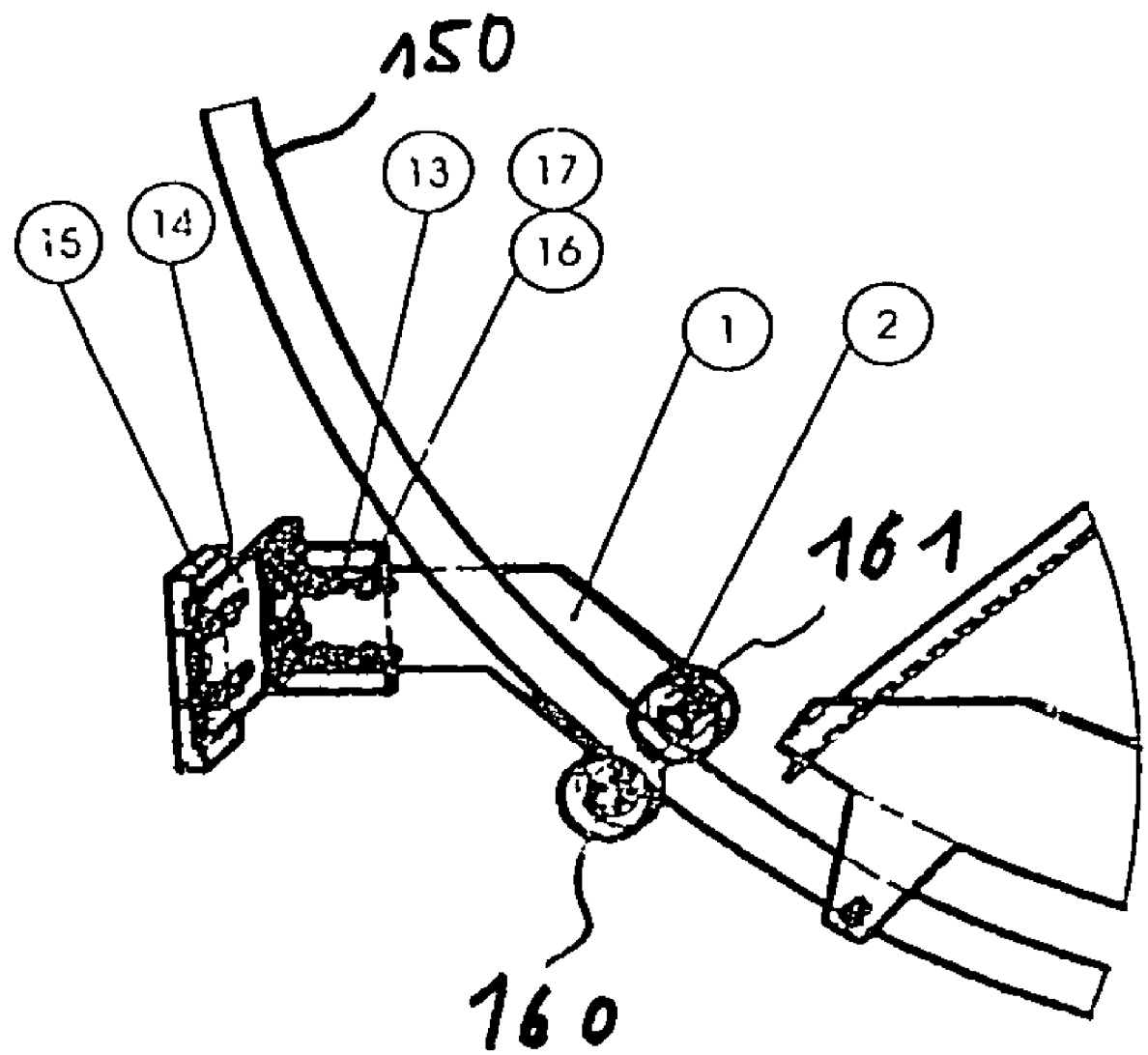
FIG. 3 is a cross-sectional view of a detail of the preferred embodiment of the device of the invention illustrated in FIG. 2.
Figure 4:
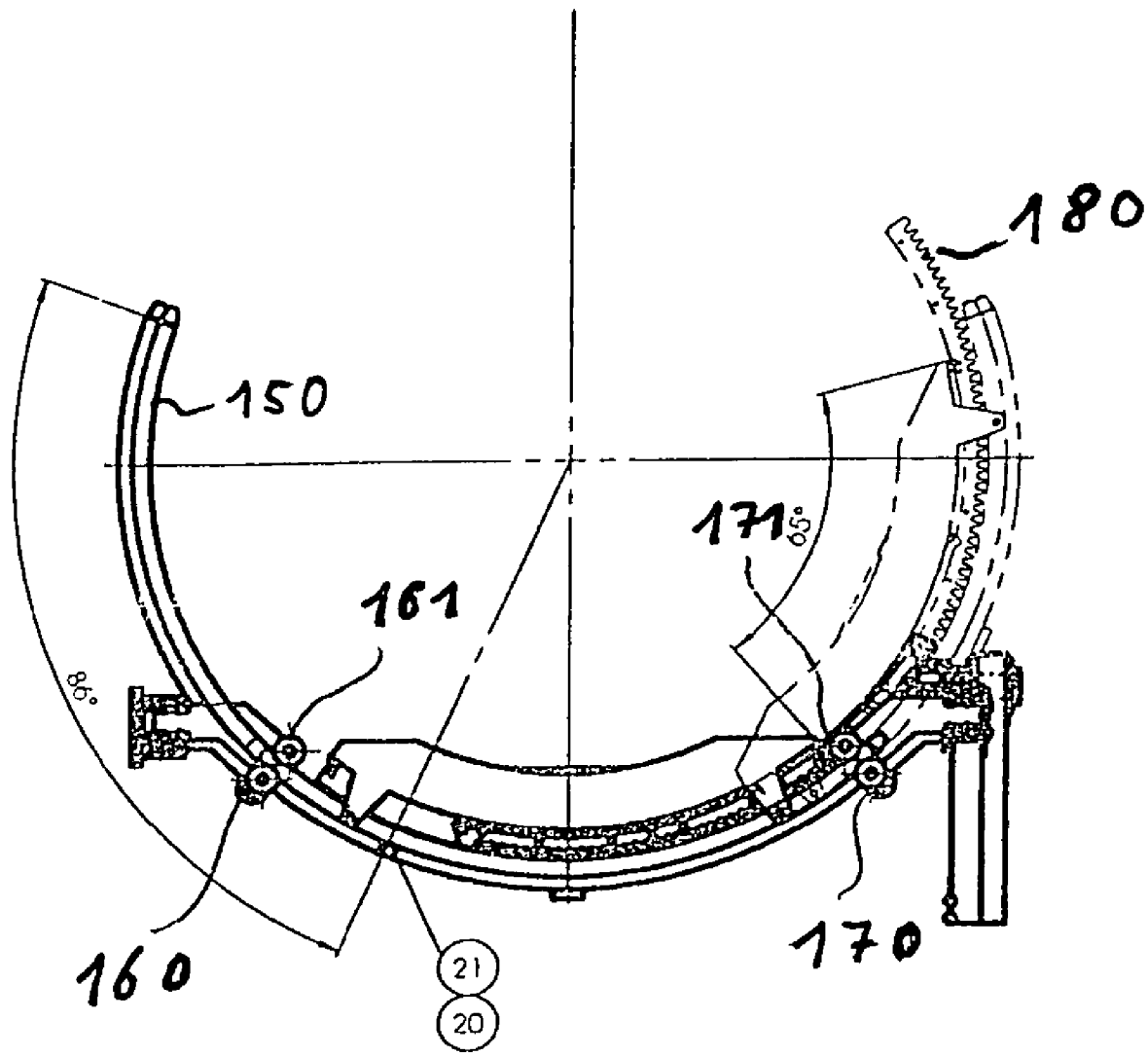
FIG. 4 is a side view of another detail of the preferred embodiment of the device of the invention illustrated in FIG. 2.
Figure 5:
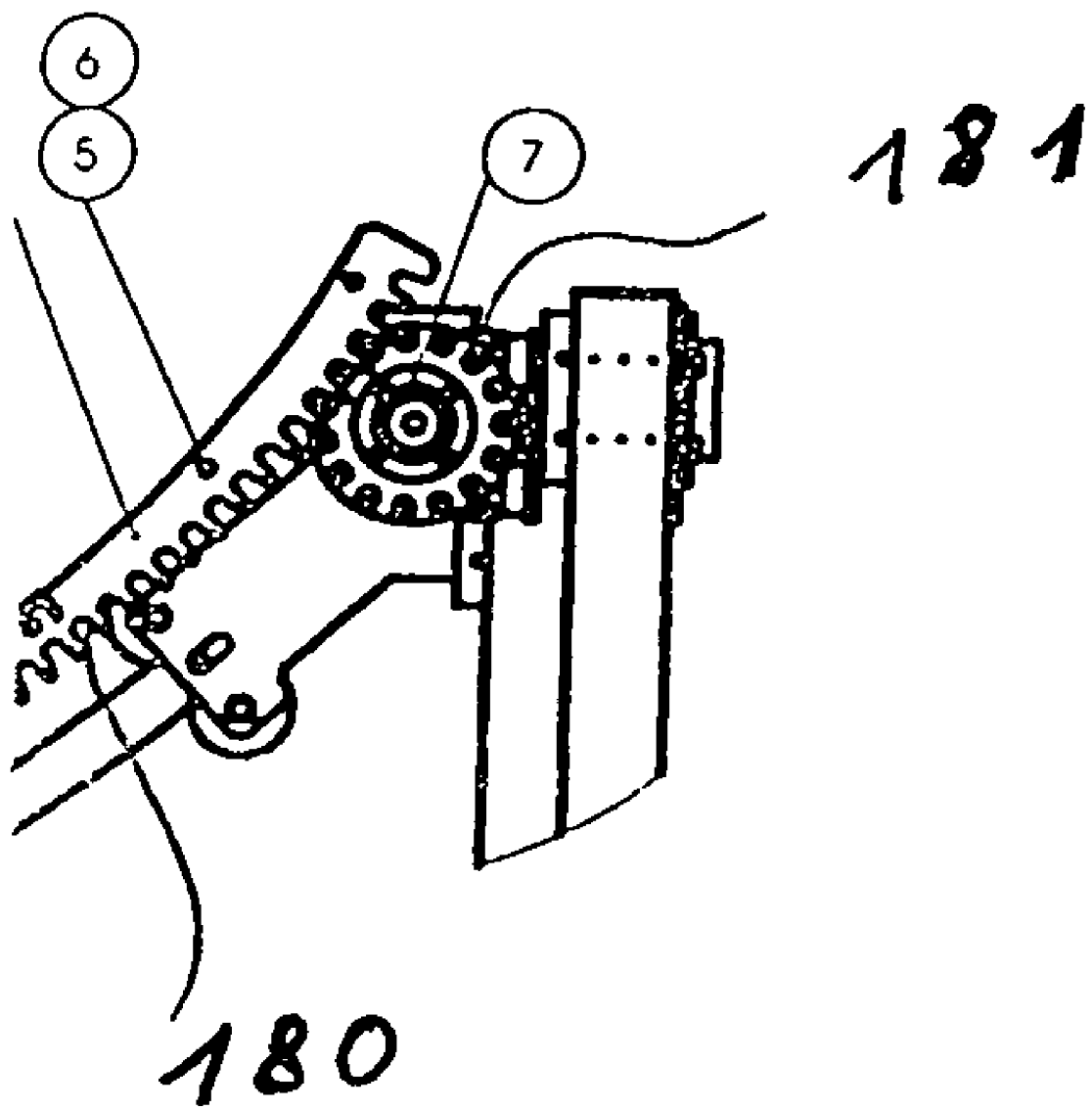
FIG. 5 is a side view of another detail of the preferred embodiment of the device of the invention illustrated in FIG. 2.

The coating device 100 of the invention for coating items, as shown in FIGS. 1 to 5, contains a drum 110, rotatably mounted about a horizontal axis, for accommodation of the items, a charging device 120 for filling the items into drum 110, a closeable opening in the drum for admission of the uncoated items into drum 110 and for discharge of the coated items from drum 110, and a spraying device disposed within drum 110 for coating the items with liquid coating material, whilst there is provided, beneath drum 110, an unloading device 130 for the removal of the coated items, and, essentially to the invention, there is provided between unloading device 130 and drum 110 a screening element 140, mounted for reciprocation and movable back and forth between a first position P1, in which it screens off unloading device 130, and a second position P2, in which it opens unloading device 130.

Screening element 140 is designed as part of a cylinder barrel, whose radius is dimensioned such that screening element 140 surrounds drum 110 with the smallest possible gap therebetween. Screening element 140 is provided, at each of its curved ends, with front abutment surfaces 141, 142. In addition, screening element 140 is firmly attached to two roller-mounted guide rails 150, 151, the two guide rails 150, 151 being dimensioned to be of a length such that the screening element 140 can be swung through approximately 90 degrees. Guide rails 150, 151 are firmly attached to front abutment surfaces 141, 142 of screening element 140.

A roller bearing made up of a plurality of rollers [160, 161; 170, 171]; [160', 161'; 170', 171'] is fixed to the unloading device to enable reciprocatory displacement of the two guide rails 150, 151 of screening element 140. Guide rails 150, 151 are of circular cross-section, the corresponding surfaces of the rollers [160, 161; 170, 171]; [160', 161'; 170', 171'] of a roller bearing adjacent thereto being of concave design having an appropriately adapted negative radius of curvature.

For the purpose of achieving a drive for reciprocatory displacement, screening element 140 is connected to a curved toothed rack 180, which cooperates with a motor-driven toothed wheel 181. Curved toothed rack 180 is connected to the outer surface of screening element 140 designed as part of a cylinder barrel, and toothed wheel 181 is fixed to unloading device 130.

According to a generally advantageous design of the device of the invention, the spraying device for cleaning fluid is disposed within drum 110 in the vicinity of the spraying device used for coating the items. Unloading device 130 contains as standard a funnel-shaped trough 131, a conveyor belt being provided beneath funnel-shaped trough 131 for the purpose of removing the items in a controlled manner.

According to another generally advantageous design of the device of the invention, drum 110 is substantially of a cylindrical or polygonal design, its opening being provided in the region of its peripheral surface. This peripheral surface is additionally provided with a plurality of bores disposed at regular intervals for the inflow of air into the drum for the purpose of drying the liquid coating material sprayed from the spraying device and deposited on the surface of the items.

The exemplary embodiment of the invention explained above serves only for the purpose of better comprehension of the teaching of the invention as defined by the claims, which should not be restricted as such by said exemplary embodiment.

The invention claimed is:

1. A coating device for coating items, comprising a drum rotatably mounted about a horizontal axis for accommodation of the items during a coating process, a loading device for filling the items into the drum, a closeable opening in the drum for admission of the items prior to coating into the drum and for allowing discharge of the items following coating from the drum, and a spraying device disposed within the drum for coating said items, wherein an unloading device is provided beneath said drum for removing the coated items, and between said unloading device and said drum there is provided a reciprocatory screening element securely attached, for guiding purposes, to at least one roller-mounted guide rail, said reciprocatory screening element being movable back and forth between a first position screening off said unloading device to a second position opening said unloading device.

2. A device as defined in claim 1, wherein said reciprocatory screening element is curved.

3. A device as defined in claim 2, wherein said reciprocatory screening element is in the form of part of a cylinder barrel.

4. A device as defined in claim 3, wherein the radius of said cylinder barrel is dimensioned such that the reciprocatory screening element surrounds said drum with a minimum space therebetween.

5. A device as defined in claim 3, wherein said reciprocatory screening element is provided, at each of the curved ends thereof, with a front abutment surface.

6. A device as defined in claim 1, wherein said at least one roller-mounted guide rail is dimensioned to have a length such that said reciprocatory screening element can be swung through approximately 90 degrees.

7. A device as defined in claim 1, wherein two guide rails are provided.

8. A device as defined in claim 7, wherein said guide rails are connected to said front abutment surfaces of said reciprocatory screening element.

9. A device as defined in claim 1, wherein at least one roller bearing is fixed to said unloading device to enable reciprocatory displacement of said guide rails of said reciprocatory screening element.

10. A device as defined in claim 9, wherein said at least one guide rail is of round cross-section and the rollers of a roller bearing are concave in cross-section.

11. A device as defined in claim 1, wherein the spraying device for the cleaning liquid is disposed in the vicinity of the spraying device used for coating the items.

12. A device as defined in claim 1, wherein said unloading device includes a funnel-shaped trough.

13. A device as defined in claim 12, wherein the discharging device beneath said funnel-shaped trough contains a conveyor belt for the removal of the items in a controlled manner.

14. A device as defined in claim 1, wherein a plurality of iterative coating processes can be carried out successively using different coating materials in each case.

15. A coating device for coating items, comprising
(a) a drum rotatably mounted about a horizontal axis for accommodation of the items during a coating process;
(b) a loading device for filling the items into the drum;
(c) a closeable opening in the drum for admission of the items prior to coating into the drum and for allowing discharge of the items following coating from the drum;
(d) a spraying device disposed within the drum for coating said items:
(e) an unloading device beneath said drum for removing the coated items; and
(f) a reciprocatory screening element between said unloading device and said drum, said reciprocatory screening element being movable back and forth between a first position screening off said unloading device to a second position opening said unloading device;
wherein said reciprocatory screening element is connected to a curved toothed rack which cooperates with a motor-driven toothed wheel for causing reciprocatory displacement of said reciprocatroy screening element.

16. A device as defined in claim 15, wherein said curved toothed rack is attached to the outer surface of said cylinder barrel.

17. A device as defined in claim 15, wherein said toothed wheel is attached to said unloading device.

* * * * *

UNITED STATES PATENT AND TRADEMARK OFFICE
CERTIFICATE OF CORRECTION

PATENT NO. : 7,252,048 B2  Page 1 of 1
APPLICATION NO. : 10/536465
DATED : August 7, 2007
INVENTOR(S) : Nohynek It is certified that error appears in the above-identified patent and that said Letters Patent is hereby corrected as shown below:

In particular, in Column 6, line 10, (Line 22 of Claim 15), after the word "said" please change "reciprocatroy screening" to correctly read:

--reciprocatory screening--.

Signed and Sealed this

Fourth Day of December, 2007

JON W. DUDAS
*Director of the United States Patent and Trademark Office*